Sept. 27, 1932.　　　　F. G. DIAGO　　　　1,879,130
ENGINE STARTER
Filed June 22, 1931　　2 Sheets-Sheet 1
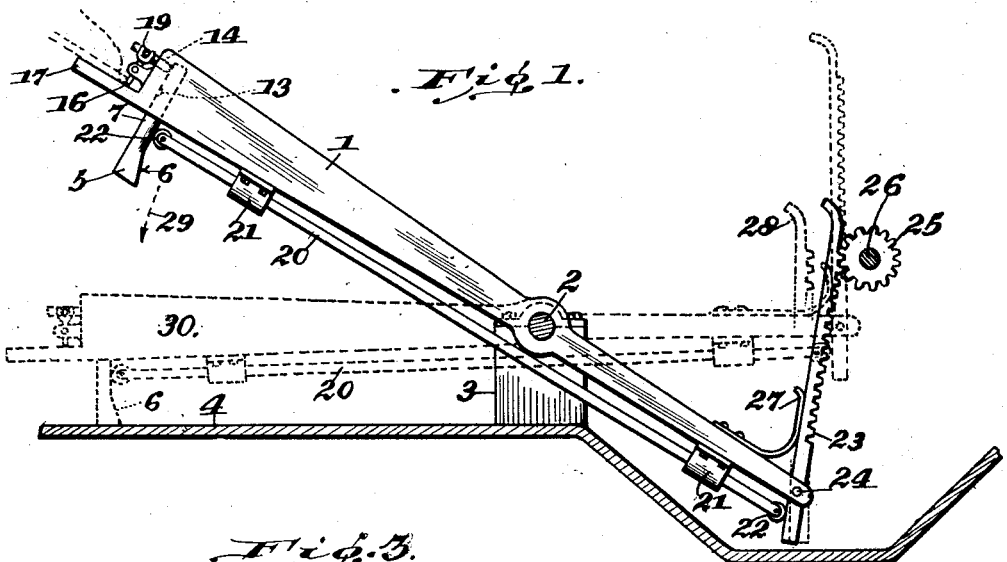
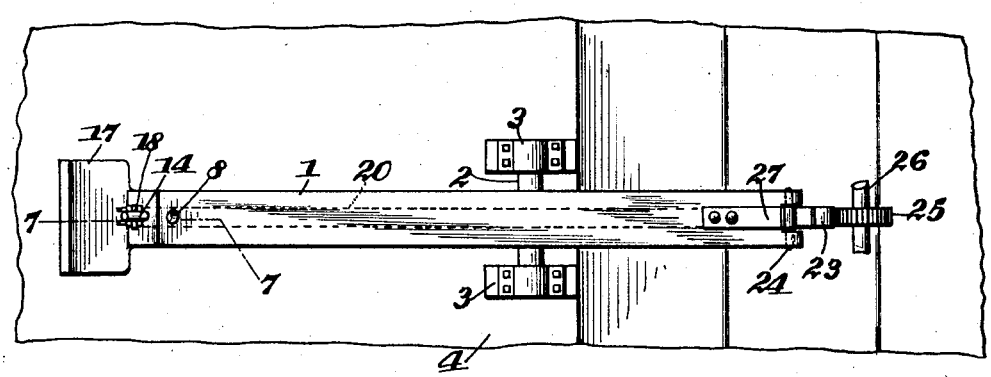
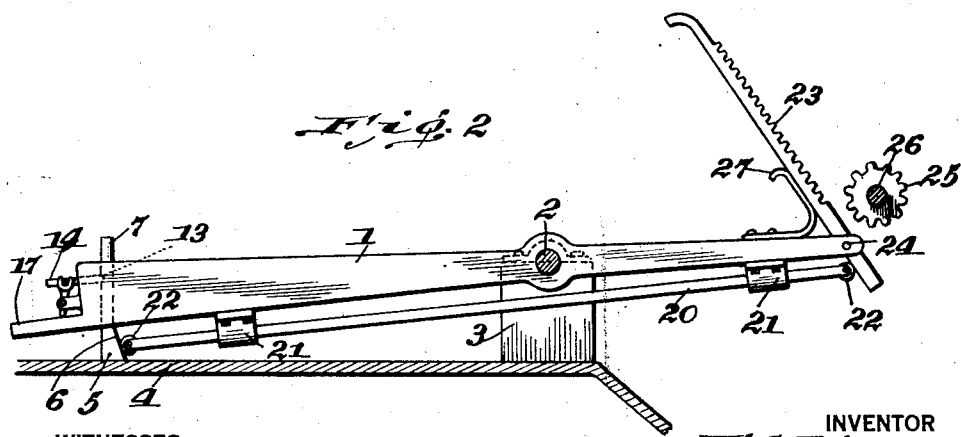
WITNESSES
INVENTOR
F. G. Diago,
BY
ATTORNEY Sept. 27, 1932.  F. G. DIAGO  1,879,130
ENGINE STARTER
Filed June 22, 1931  2 Sheets-Sheet 2
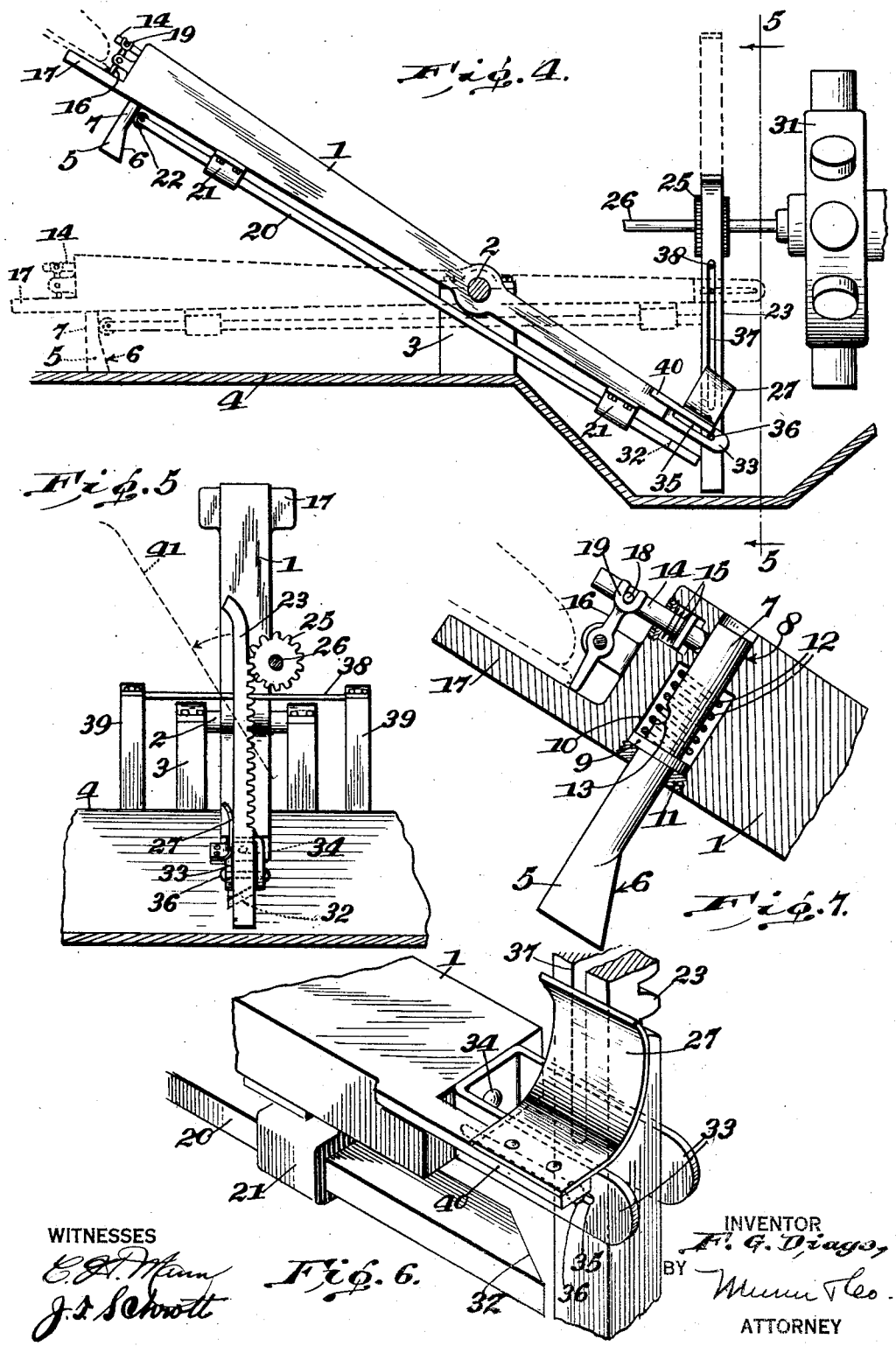

latch 14 was retracted from the notch 13, permitting the spring 12 to thrust the shank 7 and cam 6 to the extended position (Fig. 1). The resulting movement of the push rod 20 to the left is enough to enable the rack 23 to move over against and in mesh with the gear 25.

Now when the downward push is exerted on the pedal 17 the gear 25 and shaft 26 will be given a turn. The end of the turning operation occurs when the lever reaches the dotted line position in Figure 1, but at this time the rack 23 is still in engagement with the gear 25. The continued downward push will cause the shank 7 to move into the lever 1 (Fig. 2) and at the same time cause the cam 6 to push the rod 20 to the right. This causes a rocking of the rack 23 away from the gear 25 (Fig. 2) in which position the rack is intended to stay (dotted line position 28, Fig. 1) until another thrust is applied to the lever 1.

The identical operation occurs with the modified construction in Figures 4, 5 and 6, the only difference being that here the rack 23 is turned 90° in reference to the lever 1 so as to operate sidewise in reference to the lever, not frontwards as in Figure 1. It will be understood that when the cam 6 is retracted in respect to the lever 1 (Fig. 4) the bevel 32 will hold the rack 23 in the relieved position 41 (Fig. 5), just as effectively as in the instance of Figures 1 and 2.

I claim:—

1. An engine starter comprising a pivoted lever, engine actuating means carried by said lever to cause turning of the engine crank shaft upon rocking of the lever on its pivot in one direction, abutment means toward which a part of the lever is movable during said rocking, and means reaching from said part of the lever to said actuating means being operated by engagement with said abutment means for shifting said actuating means away from the crank shaft near the end of the rocking of the lever in said direction.

2. An engine starter comprising a lever, a rack pivotally mounted on the lever, a spring carried by the lever and pressing the rack into engagement with a gear on an engine crank shaft to turn the gear upon movement of the lever in one direction, means acting on the rack against the tension of the spring when the lever nears the end of said movement to shift the rack away from and disengage the gear, and a latch coacting with said last named means causing the holding of the rack in said shifted away position.

3. An engine starter comprising a lever, a rack pivotally mounted on one end of the lever, a spring to press the rack against a gear on an engine crank shaft thereby to turn the gear upon movement of the lever in one direction, a cam carried by the lever being engageable with an abutment and therefore shiftable when the lever nears the end of said movement, and means to which motion is imparted by the shifting of said cam to swing the rack away from the gear against the tension of said spring.

4. An engine starter comprising a lever, a rack pivotally mounted on one end of the lever, a spring to press the rack against a gear on an engine crank shaft thereby to turn the gear upon movement of the lever in one direction, a cam carried by the lever being engageable with an abutment and therefore shiftable when the lever nears the end of said movement, means to which motion is imparted by the shifting of said cam to swing the rack away from the gear against the tension of said spring, and a latch acting to hold the cam in the shifted position thereby to hold the rack in said swung away position.

5. An engine starter comprising a lever, fixed abutment means adjacent to which the lever is pivotally mounted, a rack pivotally carried by one end of the lever, a spring to press the rack into engagement with a gear on an engine crank shaft to turn the gear upon movement of the lever in one direction, a cam shiftably carried by the other end of the lever, means tending to urge the cam to one of its shifted positions, means actuated by the cam upon departure of said cam to its other shifted position when engaging the abutment means near the end of said movement of the lever thereby to swing the rack away from the gear, and means to hold the cam in said other shifted position thereby to hold the rack in said swung away position.

6. An engine starter comprising a pivoted lever movable into two extremes of positions, a pivoted rack carried by the lever, means by which the rack can be held retracted from a gear-actuating position during a complete movement of the lever toward and into one of the said extremes of positions, and means by which the rack is released from said retracted position to assume the gear-actuating position preparatory to moving the lever in the opposite direction toward the other extreme position.

7. An engine starter comprising a pivoted lever having a pedal on one end, a cam carried by the lever shiftable to extended and depressed positions in reference thereto, a latch to hold the cam in the depressed position, a tripper in connection with the latch for simultaneous release of the latch by means applied to the pedal to rock the lever, a rack pivoted on the other end of the lever, a spring tending to urge the rack toward a gear to be turned, and a push rod extending between the cam and rack, holding the rack from the gear when the cam is depressed but enabling movement of the rack toward the gear when the cam is extended upon said release of the latch.

8. An engine starter comprising a pivoted lever, a cam on the lever movable into two operating positions, a rack carried by the lever, a carrier on which the rack is mounted, means swivelly connecting the carrier with the lever, a spring bearing on the rack tending to move it into engagement with a gear to be turned, and a push rod extending from the cam to the rack, said rod having a bevelled end adjacent to and operative upon the rack.

FEDERICO G. DIAGO.

Patented Sept. 27, 1932

1,879,130

UNITED STATES PATENT OFFICE

FEDERICO G. DIAGO, OF HABANA, CUBA

ENGINE STARTER

Application filed June 22, 1931. Serial No. 546,117.

This invention relates to improvements in engine starters, and it consists of the constructions, combinations and arrangements herein described and claimed.

An object of the invention is to provide a mechanical engine starter, capable of use in connection with any of the known varieties of internal combustion engines, one of the outstanding features being that arrangement of the engine starter whereby the foot power of the operator can be utilized in actuating the engine.

Other objects and advantages will appear in the following specification, reference being had to the accompanying drawings in which Figure 1 is a view illustrating the normal or starting position of the engine starter in full lines and the position of the starter at the end of the starting position in dotted lines.

Figure 2 is a view illustrating the final position of the engine starter wherein the rack is automatically disengaged from the crank shaft gear.

Figure 3 is a plan view of the engine starter.

Figure 4 is a view similar to Figure 1, illustrating a slight modification necessary to the adaptation of the starter to a different type of engine.

Figure 5 is a section taken on the line 5—5 of Figure 4.

Figure 6 is a detail perspective view of that end of the lever in Figure 14 carrying the rack.

Figure 7 is a detail section taken on the line 7—7 of Figure 3 illustrating the details of the latch and cam mechanism.

The engine starter herein disclosed is primarily adapted to operation by the foot power of the operator, a characteristic of the starter lever being the turning over of the engine by means of its carried rack during the major portion of the rocking motion of the lever, there being means which comes into play near the end of the movement of the lever for automatically disengaging the rack from the crank shaft gear. This particular starter is intended to replace the conventional electrical starter, and like the latter is adaptable to use in connection with any of the known types of internal combustion engines.

As previously indicated in the brief description of the views, the invention comprises two modifications respectively adapted to engines placed crosswise and longitudinally of the chassis of the vehicle. The principal parts of the engine starter are alike in both modifications, and in order to avoid a duplication of description similar reference characters are used to denote corresponding parts throughout.

Referring first to Figures 1, 2, 3 and 7, the engine starter comprises a lever 1, appropriately pivoted at 2 on a fixed support 3 of any suitable kind. This support is mounted on a floor 4 which is hereinafter identified as a fixed abutment for the head 5 of a cam 6, which cam occurs on the exposed end of a shank 7 (Fig. 7) which is slidable in a counterbore 8 in the foot-end of the lever 1. This shank has a collar 9 (Fig. 7) which operates in a bore 10 in said lever 1.

After putting the shank 7 in place the bore 10 is closed with a screw plug 11. This screw plug limits the outward thrust of the shank 7 under the impulse of a spring 12 fitted in the bore 10 as shown. One side of the shank 7 is notched at 13 to receive the inner end of a latch 14 which is provided with bearing in the lever 1.

This latch is pressed toward the shank 7 by a spring 15 which is mounted very much like the spring 12. There is a time when the cam 6 becomes depressed in reference to the lever 1 (Fig. 2), and at such time the spring 15 acts to push the end of the latch 14 into the notch 13, and so hold the cam 6 in the depressed position. In practice any appropriate arrangement will be adopted for keeping the shank 7 from turning, the obvious idea being to perpetually insure registration of the notch 13 with the latch 14 so that engagement can be made when necessary.

A pivoted tripper 16 is so located as to be accessible to the toe of the shoe of the operator. To this end the foot-end of the lever 1 terminates in a pedal 17 on which the operator will place his foot (see dotted lines), and with the act of so placing his foot he will turn the tripper 16, causing a retraction of the latch 14 and a release of the shank 7 so that the cam 6 can fly back to its retracted position (Fig. 1).

One or a pair of trunnions 18 (Fig. 7) extending from the latch 14 is received by the forked end 19 of the tripper 16. It is readily seen that with an inward push on the bottom end of the tripper the latch 14 will be retracted as stated. When the cam 6 is depressed (Fig. 2), the latch 14 will engage the notch 13 by virtue of the pressure of the spring 15, the tripper 16 then tilting on its pivot to a position in readiness to be engaged by the toe of the shoe.

The sole purpose of the cam 6 is to actuate a push rod 20 in one direction. That direction is toward the right, viewing the starter as in Figure 2. The push rod is carried by an appropriate number of bearings 21 mounted on the lever 1. The ends of the push rod are equipped with bearing rollers 22, one of which rides on the side of the shank 7 and on the cam 6, the other of which rides on the back of a rack 23 which is pivoted at 24 on the right extremity of the lever 1.

This rack is free to move within limits. It is adapted to engage a gear 25 on the engine crank shaft 26. The engine is not shown in Figures 1 and 2, but it may be explained that this particular engine is intended to be mounted transversely of the vehicle chassis. The upper end of the rack 23 is curved, the idea being to provide an easy approach onto the gear 25. A leaf spring 27, secured to the lever 1, presses on back of the rack and tends to hold the latter in engagement with the gear 25.

Thus far it will be understood that as long as the cam 6 is latched to the depressed position in reference to the lever 1, the rack 23 will assume the dotted line position 28 in Figure 1. This clears the gear 25 of the rack 23 so that the gear can rotate with the crank shaft 26 without impediment. Obviously it would not do to have the rack 23 in contact with the gear 25.

With this position of the rack in mind, should the operator now desire to crank the engine he would place one foot on the pedal 17 and press down, (arrow 29, Fig. 1) but in doing so he would push in on the tripper 16 with the toe of the shoe, thus pulling the latch 14 back (Fig. 7) and releasing the spring 12 so that it can extend the cam and shank.

This act frees the rack 23 so that the spring 27 can push the rack against the gear 25 (full lines, Fig. 1). The downward push is now transmitted to the gear 25 by means of the rack so that the crank shaft 26 is given a turn. The turning motion will end when the lever 1 reaches the approximate position 30 (Fig. 1). By this time the last teeth of the rack will have reached the gear 25. The head 5 will have struck the abutment 4, and upon continuing the downward push the cam 6 will be caused to move toward the lever 1 and in doing so to exercise a push on the rod 20 so that the rack 23 is rocked away from the gear 25 as plainly shown in Figure 2.

The identical principle obtains in Figures 4, 5 and 6, but here the crank shaft 26 of the engine 31 extends longitudinally of the chassis instead of transversely as before. This requires a turning around of the rack 23 a distance of 90° in reference to the lever 1, and this circumstance requires some modification in the structure which is briefly described as follows:—

A bevel 32 now takes the place of the bearing roller on one end of the push rod 20. This bevel is in such relationship to the rack 23 that the rack carrier 33 (Fig. 6) will be rocked at its pivot 34 when the rod is pushed upon by means of the cam 6 as before. The carrier 33 comprises a fork by which the rack 23 is received. The carrier is slotted at 35 to receive a pin 36 protruding from opposite sides of the rack. This slot and pin connection is essential as a compensator for the arcuate motion of the lever 1.

It is necessary to cause the rack 23 to travel on straight lines in reference to the gear 25. The travel is kept on such straight lines partly by the engagement of the rack and gear teeth and by a slot and pin connection 37, 38. The pin 38 is fixedly carried by supports 39 (Fig. 5). The slot is cut in the rack 23 from the tooth to the backside (Fig. 6). The presence of the slot 37 does not impair the action of the rack 23 in the least.

A bracket 40, projecting from the lever 1, carries the leaf spring 27 which is the equivalent of the correspondingly designated spring in Figure 1. As before, the purpose of this spring is to press the rack 23 against the gear 25, the only time when the function of the spring 27 is suspended occurring when the cam 6 is depressed in reference to the lever 1. At such a time the rack 23 is held in the dotted line position 41 (Fig. 5).

The operation is doubtless understood from the context, but may be briefly reviewed as follows:—Assume that the operator has placed one foot on the pedal 17 and has pushed on the tripper 16 (Fig. 7) until the